(12) United States Patent
Yang

(10) Patent No.: US 12,534,075 B2
(45) Date of Patent: Jan. 27, 2026

(54) VEHICLE AND CONTROL METHOD THEREOF

(71) Applicants: Hyundai Motor Company, Seoul (KR); Kia Corporation, Seoul (KR)

(72) Inventor: Heegun Yang, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 212 days.

(21) Appl. No.: 18/213,757

(22) Filed: Jun. 23, 2023

(65) Prior Publication Data

US 2023/0331223 A1 Oct. 19, 2023

(30) Foreign Application Priority Data

Sep. 2, 2022 (KR) .................. 10-2022-0111398

(51) Int. Cl.
*B60W 30/095* (2012.01)
*B60W 30/06* (2006.01)
*B60W 40/02* (2006.01)

(52) U.S. Cl.
CPC ........ *B60W 30/0956* (2013.01); *B60W 30/06* (2013.01); *B60W 40/02* (2013.01); *B60W 2756/10* (2020.02)

(58) Field of Classification Search
None
See application file for complete search history.

(56) References Cited

U.S. PATENT DOCUMENTS

| | | | |
|---|---|---|---|
| 2019/0079521 A1* | 3/2019 | Blum | A63G 31/00 |
| 2020/0172090 A1* | 6/2020 | Han | G06K 7/1413 |
| 2020/0269832 A1* | 8/2020 | Kwon | B60W 30/06 |
| 2020/0406900 A1* | 12/2020 | Choi | B60W 40/08 |
| 2021/0245734 A1* | 8/2021 | Harai | B62D 15/0285 |

* cited by examiner

*Primary Examiner* — Arslan Azhar
(74) *Attorney, Agent, or Firm* — Morgan Lewis & Bockius LLP

(57) ABSTRACT

A vehicle includes a sensor unit provided to detect an external environment of the vehicle, a steering device provided to steer wheels of the vehicle, a power system provided to transmit power to the wheels, and a controller configured for determining an attempt of other vehicle to move when a parking of the vehicle is abnormal parking and control the power system and the steering device to move the vehicle when the controller concludes that there is the attempt of the other vehicle to move.

18 Claims, 10 Drawing Sheets

VEHICLE AND CONTROL METHOD THEREOF

CROSS-REFERENCE TO RELATED APPLICATION(S)

The present application claims priority to Korean Patent Application No. 10-2022-0111398, filed on Sep. 2, 2022, the entire contents of which is incorporated herein for all purposes by this reference.

BACKGROUND OF THE PRESENT DISCLOSURE

Field of the Present Disclosure

The present disclosure relates to a vehicle that moves in response to an attempt of another vehicle to leave when parked near to the other vehicle which is already parked, and a control method thereof.

Description of Related Art

Vehicles are often parked around other vehicles already parked when there is no parking space. That is, when there is no parking space, a driver of a vehicle may double-park blocking the other already parked vehicles to leave.

In the instant case, a driver of the other vehicle already parked may pull out the other vehicle only after pushing and moving the double-parked vehicle by force.

However, in the case of a weak elderly or female driver, it may be difficult to move other double-parked vehicle, and an accident may occur when wheels of the other double-parked vehicle are not aligned or on an inclined road surface.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle capable of moving without intervention of a driver in response to an attempt of other already parked vehicle to leave when parked around the other already parked vehicle, and a control method thereof.

Additional aspects of the present disclosure will be set forth in part in the description which follows, and in part, will be obvious from the description, or may be learned by practice of the present disclosure.

In accordance with an aspect of the present disclosure, a vehicle includes a sensor unit provided to detect an external environment of the vehicle, a steering device provided to steer wheels of the vehicle, a power system provided to transmit power to the wheels, and a controller configured for determining an attempt of other vehicle to move when a parking of the vehicle is abnormal parking and control the power system and the steering device to move the vehicle when it is determined that there is an attempt of the other vehicle to move.

The controller may detect an amount of light emitted from the other vehicle based on a sensing value of the sensor unit and determine that there is the attempt of the other vehicle to move when the amount of light is equal to or greater than a reference value.

The controller may detect a driver of the other vehicle, the driver moving in a direction of the other vehicle based on the sensing value of the sensor unit and determine that there is the attempt of the other vehicle to move when the driver enters the inside of the other vehicle.

The controller may be configured to determine that there is the attempt of the other vehicle to move when a preset motion of the vehicle is detected from a front side or a rear side of the vehicle based on the sensing value of the sensor unit.

The controller may be configured to determine a movement distance and a movement angle for allowing the parking type to be normal parking upon concluding that there is the attempt of the other vehicle to move, and control the power system and the steering device of the vehicle based on the determined movement distance and the determined movement angle.

The controller may update the determined movement distance and the determined movement angle to avoid an obstacle when the obstacle is located on a movement path of the vehicle according to the determined movement distance and the determined movement angle.

The controller may move to a minimum movement distance and a minimum movement angle of the vehicle for allowing the other vehicle to leave when the movement distance and the movement angle for allowing the parking of the vehicle to be the normal parking are not secured, and control the power system and the steering device of the vehicle to move the vehicle to a parking space when the other vehicle leaves the parking space where the other vehicle has been located.

The vehicle may further include a communication device, wherein the controller may be configured to control the communication device to transmit information related to a movement of the vehicle to a user terminal based on the movement of the vehicle.

The vehicle may further include an output device, wherein the controller may be configured to control the output device to output a message about a movement of the vehicle to the output device based on the movement of the vehicle.

The sensor unit may include at least one of a camera provided to obtain image data of the external environment of the vehicle, a radar provided to obtain radar data of the external environment of the vehicle, and an ultrasound sensor provided to obtain ultrasound data of the external environment of the vehicle.

In accordance with an aspect of the present disclosure, a control method of a vehicle which, includes a sensor unit provided to detect an external environment of the vehicle, a steering device provided to steer wheels of the vehicle, and a power system provided to transmit power to the wheels, includes determining an attempt of other vehicle to move when a parking type is abnormal parking, and controlling the power system and the steering device of the vehicle to move the vehicle when the controller concludes that there is the attempt of the other vehicle to move.

The determining of the attempt of the other vehicle to move may include detecting an amount of light emitted from the other vehicle based on a sensing value of the sensor unit, and concluding that there is the attempt of the other vehicle to move when the amount of light is equal to or greater than a reference value.

The determining of the attempt of the other vehicle to move may include detecting a driver of the other vehicle moving in a direction of the other vehicle based on the sensing value of the sensor unit, and concluding that there is the attempt of the other vehicle to move when the driver enters the inside of the other vehicle.

The determining of the attempt of the other vehicle to move may include concluding that there is the attempt of the other vehicle to move when a preset motion of the vehicle is detected from a front side or a rear side of the vehicle based on the sensing value of the sensor unit.

The controlling of the power system and the steering device may include determining a movement distance and a movement angle of the vehicle for allowing the parking of the vehicle to be normal parking based on the attempt of the other vehicle to move, and controlling the power system and the steering device of the vehicle based on the determined movement distance and the determined movement angle.

The control method may further include updating the determined movement distance and the determined movement angle to avoid an obstacle when the obstacle is located on a movement path of the vehicle according to the determined movement distance and the determined movement angle.

The controlling of the power system and the steering device may include moving to a minimum movement distance and a minimum movement angle of the vehicle for allowing the other vehicle to leave when the movement distance and the movement angle for allowing the parking of the vehicle to be the normal parking are not secured, and controlling the power system and the steering device of the vehicle to move the vehicle to a parking space when the other vehicle leaves the parking space where the other vehicle has been located.

The control method may further include controlling a communication device to transmit information related to a movement of the vehicle to a user terminal based on the movement of the vehicle.

The control method may further include controlling an output device to output a message about a movement of the vehicle to the output device based on the movement of the vehicle.

The sensor unit may include at least one of a camera provided to obtain image data of the external environment of the vehicle, a radar provided to obtain radar data of the external environment of the vehicle, and an ultrasound sensor provided to obtain ultrasound data of the external environment of the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
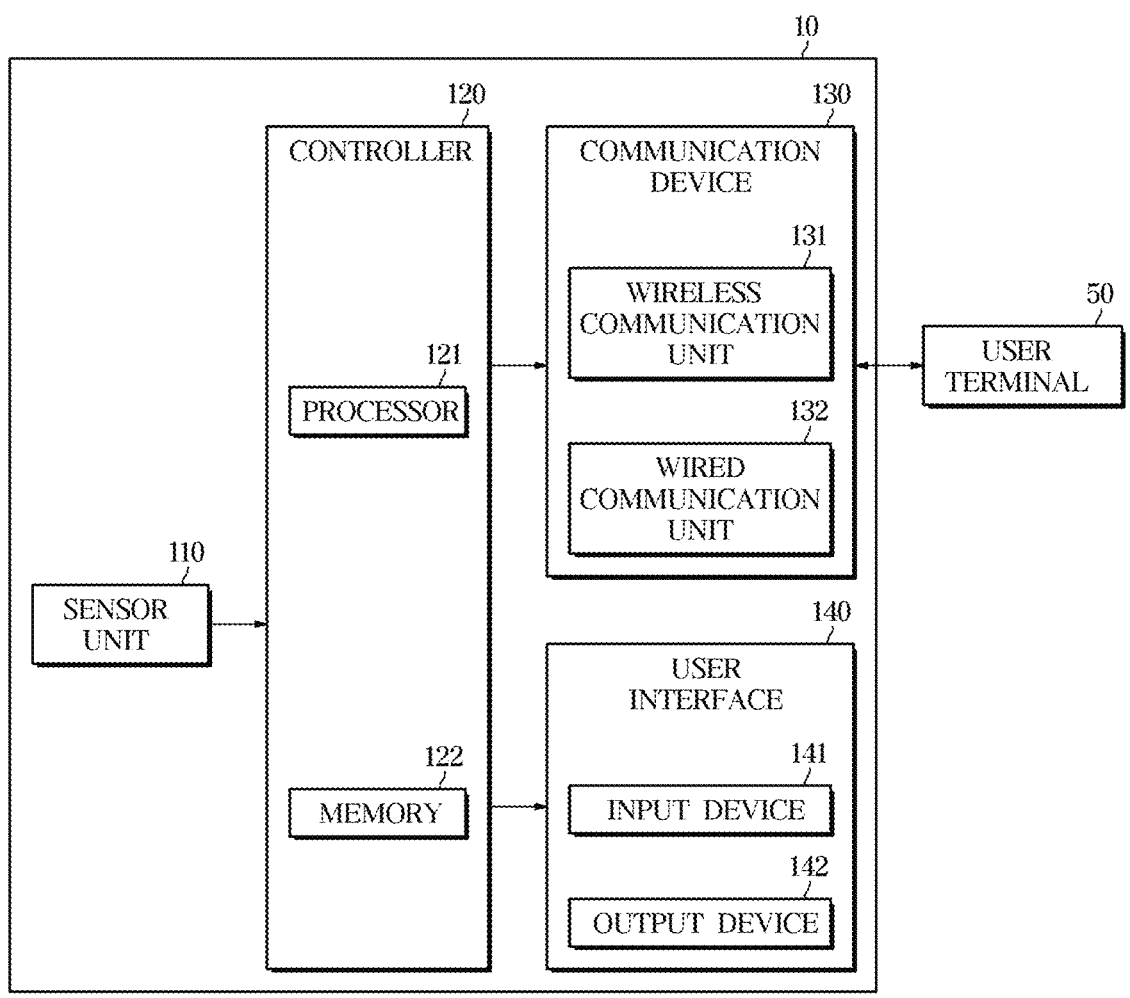
FIG. 1 is a control block diagram of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Throughout the specification, like reference numerals refer to like elements. The present specification does not describe all factors of embodiments, and duplicative contents between general contents or embodiments in the field of the present disclosure will be omitted.

Throughout the specification, when a part is referred to as being "connected" to another part, it includes not only a direct connection but also an indirect connection, and the indirect connection includes connecting through a wireless network.

When it is described that a part "includes" an element, it means that the element may further include other elements, not excluding the other elements unless specifically stated otherwise.

The singular forms a "an," and "the" include plural referents unless the context clearly dictates otherwise.

Furthermore, terms such as "~unit", "~part," "~block," "~member," "~module," and the like may denote a unit of processing at least one function or operation. For example, the terms may refer to at least one hardware such as a field-programmable gate array (FPGA)/an application specific integrated circuit (ASIC), at least one software stored in a memory, or at least one process processed by a processor.

In each step, an identification numeral is used for convenience of explanation, the identification numeral does not describe the order of the steps, and each step may be performed differently from the order specified unless the context clearly states a particular order.

Hereinafter, embodiments of a vehicle and a control method thereof according to an aspect will be described in detail with reference to the accompanying drawings.

FIG. 1 is a control block diagram of a vehicle according to an exemplary embodiment of the present disclosure.

Referring to FIG. 1, a vehicle 10 according to an exemplary embodiment of the present disclosure includes a sensor unit 110 (sensors 110-1, 110-2, 110-3, and 110-4) provided to detect an external environment of the vehicle 10, a communication device 130 provided to perform communication with a user terminal 50, a user interface 140 including an input device 141 and an output device 142, a steering device for steering wheels, a power system for transmitting power to the wheels, and a controller 120 configured to control movement of the vehicle 10.

The sensor unit 110 (the sensors 110-1, 110-2, 110-3, and 110-4) according to various exemplary embodiments of the present disclosure may measure the external environment of the vehicle 10.

The sensor unit 110 (the sensors 110-1, 110-2, 110-3, and 110-4) may identify other vehicles 20 existing outside the vehicle 10, and may also identify objects existing outside the vehicle 10 such as obstacles.

To the present end, the sensor unit 110 (the sensors 110-1, 110-2, 110-3, and 110-4) may include at least one of a camera for obtaining image data of the external environment of the vehicle 10, a radar for obtaining radar data of the external environment of the vehicle 10, and an ultrasonic sensor for obtaining ultrasound data of the external environment of the vehicle 10.

The camera, radar and ultrasonic sensor included in the sensor unit 110 (the sensors 110-1, 110-2, 110-3, and 110-4) may be located on front, rear, and side surfaces of a body of the vehicle 10 to detect the external environment of the vehicle 10, and the location and number of cameras and radars are not limited as long as they may detect the external environment of the vehicle 10.

The communication device 130 according to various exemplary embodiments of the present disclosure may perform communication with the other vehicles 20 or an external terminal device using wireless communication. The communication device 130 may include a wireless communication unit 131 and a wired communication unit 132.

According to an exemplary embodiment of the present disclosure, the wireless communication may include, for example, cellular communication using at least one of fifth generation (5G), LTE, LTE Advance (LTE-A), Code Division Multiple Access (CDMA), wideband CDMA (WCDMA), a Universal Mobile Telecommunication System (UNITS), wireless broadband (Wi-Bro), and a global system for mobile communications (GSM). According to an exemplary embodiment of the present disclosure, the wireless communication may include, for example, at least one of wireless fidelity (WiFi), Bluetooth, Bluetooth Low Energy (BLE), Zigbee, Near Field Communication (NFC), magnetic secure transmission, radio frequency (RF), and body area network (BAN). However, the wireless communication is not limited to the above examples, and any communication protocol capable of performing wireless communication may be used without limitation.

When the double-parked vehicle 10 moves, the communication device 130 may transmit information related to the movement of the vehicle 10 to the user terminal 50. Also, the communication device 130 may transmit information related to the impossibility of movement of the vehicle 10 when there is no path along which the double-parked vehicle 10 may move.

The controller 120 according to various exemplary embodiments of the present disclosure may recognize a parking area line around the vehicle 10 when the vehicle 10 is turned off, and determine a parking type as abnormal parking when the parking area line is not recognized.

That is, the controller 120 may obtain information related to whether a parking area line is displayed around the parking position of the vehicle 10 based on at least one of image data, radar data, and ultrasound data obtained through the sensor unit 110 (the sensors 110-1, 110-2, 110-3, and 110-4).

Thereafter, the controller 120 may be configured to determine whether at least one of the other vehicles 20 are attempting to move when the parking type is the abnormal parking, and control the power system and the steering device of the vehicle 10 to move the vehicle 10 when it is determined that is the attempt of the at least one of the other vehicles 20 to move.

In the instant case, the controller 120 may be configured to determine whether at least one of the other vehicles 20 has attempted to move based on a sensing value of the sensor unit 110 (the sensors 110-1, 110-2, 110-3, and 110-4).

The controller 120 may detect an amount of light emitted from the other vehicles 20 based on the sensing value of the sensor unit 110 (the sensors 110-1, 110-2, 110-3, and 110-4), and determine that at least one of the other-vehicles 20 has attempted to move when the amount of light is equal to or greater than a reference value.

Also, the controller 120 may detect a driver moving in the direction of at least one of the other vehicles 20, and determine that the at least one of the other vehicles 20 has attempted to move when the driver enters the inside of the at least one of the other vehicles 20.

Also, the controller 120 may detect a driver moving in the direction of at least one of the other vehicles 20 based on the sensing value of the sensor unit 110 (the sensors 110-1, 110-2, 110-3, and 110-4), and determine that the at least one of the other vehicles 20 has attempted to move when a preset motion of the driver inside the at least one of the other vehicles 20 is detected from the front or rear of the entering vehicle 10.

The determining of the controller 120 that at least one of the other vehicles 20 has attempted to move is not limited thereto, and may include cases in which all actions that the other vehicles 20 perform to leave in a state of being parked are detected.

Thereafter, when it is determined that the other vehicles 20 do not attempt to move, the controller 120 may detect the surroundings of the vehicle 10 until at least one of the other vehicles 20 attempts to move.

On the other hand, when it is determined that at least one of the other vehicles 20 attempts to move, the controller 120 may be configured to determine a movement distance and a movement angle that cause the parking type to be normal parking.

Accordingly, when it is determined that at least one of the other vehicles 20 attempts to move, the controller 120 may control the power system and steering device of the vehicle 10 to move the vehicle 10 to a place for the vehicle 10 to be the normal parking.

In the instant case, the controller 120 may update the movement distance and the movement angle to avoid an obstacle when the obstacle is located on a movement path of the vehicle according to the determined movement distance and the determined movement angle.

Also, the controller 120 may move the vehicle to a minimum movement distance and a minimum movement angle for the other vehicles 20 to leave when the movement distance and the movement angle for allowing the parking type to be the normal parking are not secured.

Thereafter, the controller 120 may control the power system and the steering device so that the vehicle 10 moves to a parking space when at least one of the other vehicles 20 leaves the parking space where it is located.

The user interface 140 may include the input device 141 and the output device 142.

The input device 141 may receive an input of a driver allowing or disallowing the movement of the vehicle 10 and transmit the received input to the controller 120. The output device 142 may include a display inside the vehicle 10 and a lamp and speaker outside the vehicle 10.

The output device 142 may include headlights and taillights outside the vehicle 10), and when the vehicle 10 moves, the controller 120 may blink the headlights and taillights to notify the movement of the vehicle 10 to surrounding vehicles and pedestrians.

The output device 142 may also include a speaker that transmits sound to the outside of the vehicle 10, and when the vehicle 10 moves, the controller 120 may transmit a message about the movement of the vehicle 10 to the speaker.

The user interface 140 may include an audio video navigation (AVN) display. However, in the exemplary embodiment of the present disclosure, the input device 141 receiving a user command and the output device 142 displaying images and notifications are not necessarily limited to the Audio, Video and Navigation (AVN) display.

Even when it is not the AVN display, the user interface 140 may be an input device 141 as long as a user riding in the vehicle 10 may input a command, and may be an output device 142 that displays a notification as long as a displayed content may be identified.

For example, the input device 141 may be an automotive voice recognition system fora vehicle.

When the user utters a command as a voice, the automotive voice recognition system for a vehicle analyzes the input command, is configured to determine a domain corresponding to the command, and is configured to perform an operation.

Therefore, when the automotive voice recognition system fora vehicle is used as the input device 141, the user may input a command by voice.

In addition to this, the input device 141 may be used in an electric system for controlling the vehicle 10, and may control an air conditioning system of the vehicle 10 or input a destination into a navigation system through voice recognition.

In addition to these, the input device 141 may display information related to a state of the vehicle 10, display information for guiding settings of the vehicle 10, display a navigation screen, or display multimedia contents, or information related to driving.

Each component of the vehicle 10 has been described in detail above. Hereinafter, the movement of the vehicle 10 in a double parking situation will be described in detail.

Figure 2:
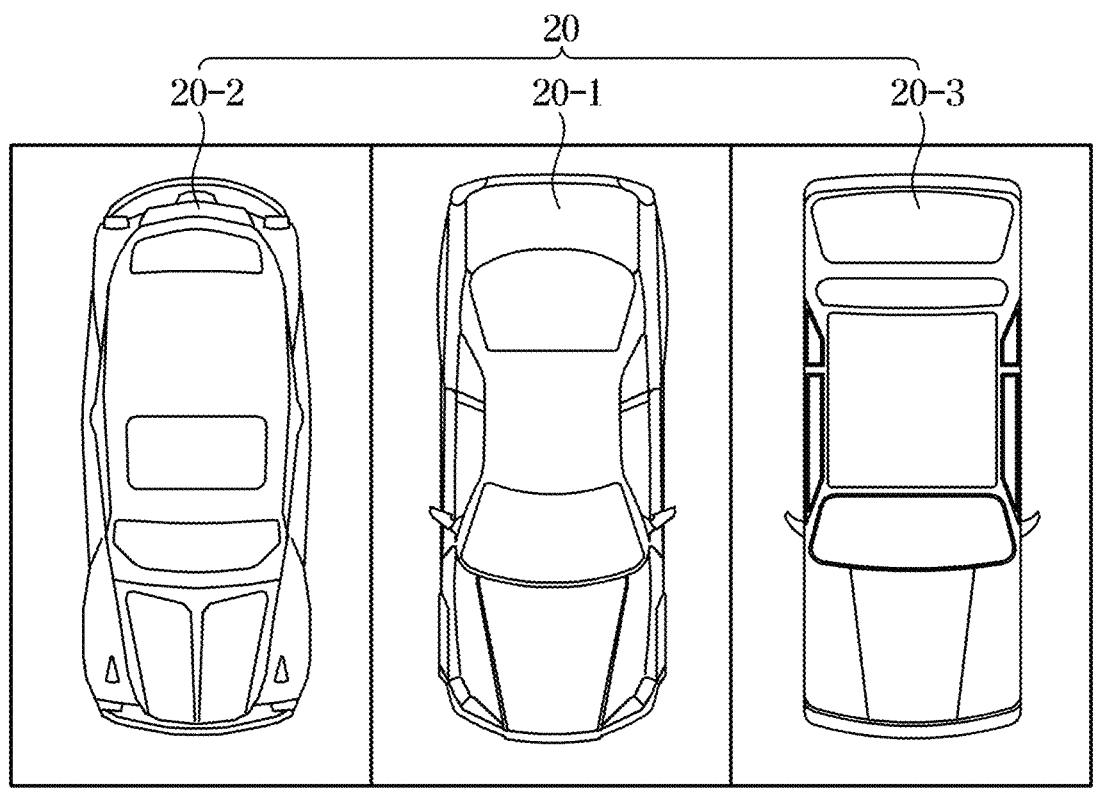
FIG. 2 is a diagram illustrating a case in which the vehicle is double-parked according to an exemplary embodiment of the present disclosure.
Figure 2:
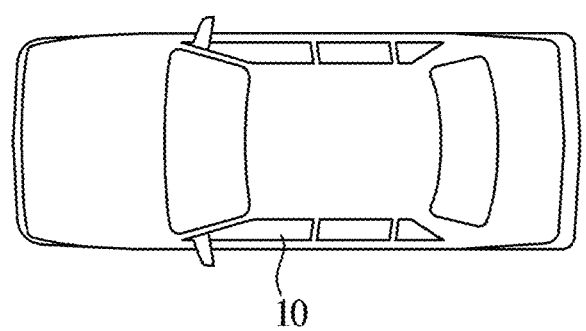

FIG. 2 is a diagram illustrating a case in which the vehicle is double-parked according to an exemplary embodiment of the present disclosure.

Referring to FIG. 2, the vehicle 10 according to various exemplary embodiments of the present disclosure may be parked around the other vehicles 20 when there is no parking space.

Accordingly, a case may occur in which the other vehicles 20 are blocked from leaving by the double-parked vehicle 10 even when the other vehicles 20 want to leave.

For example, as illustrated in FIG. 2, other vehicle 20-1 may not be able to leave by being blocked by the vehicle 10 even though it wants to leave.

In the instant case, because a driver of the other vehicle 20-1 should call the driver of the vehicle 10 to request the movement of the vehicle 10 or directly push and move the vehicle 10, time and effort are required to move the vehicle 10. Furthermore, the driver of the other vehicle 20-1 may be injured while moving the vehicle 10, or the vehicle 10 may continue to move on a slope, causing property and human damage.

Furthermore, because even if the driver of the other vehicle 20-1 directly moves the vehicle 10 and the other vehicle 20-1 has left, the vehicle 10 may block other vehicles 20-2 and 20-3, which are parked, again, the same problem may occur again and again.

According to the vehicle 10 according to an exemplary embodiment of the present disclosure, because even if the driver of the other vehicle 20-1 does not make an effort to move the vehicle 10, the controller 120 moves and parks the vehicle 10, there is an effect of reducing the time and effort of the driver of the other vehicle 20-1 and preventing property and human damage.

Figure 3:
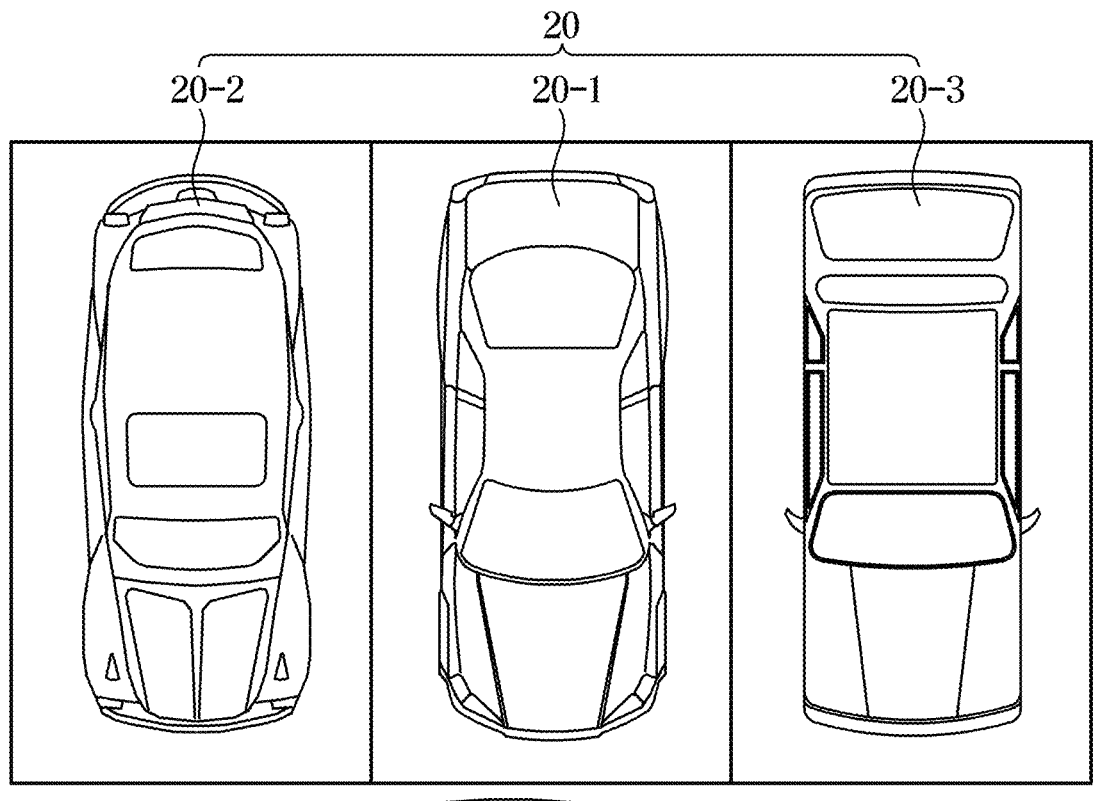
FIG. 3 is a diagram illustrating that the vehicle recognizes a parking area line according to an exemplary embodiment of the present disclosure.
Figure 3:
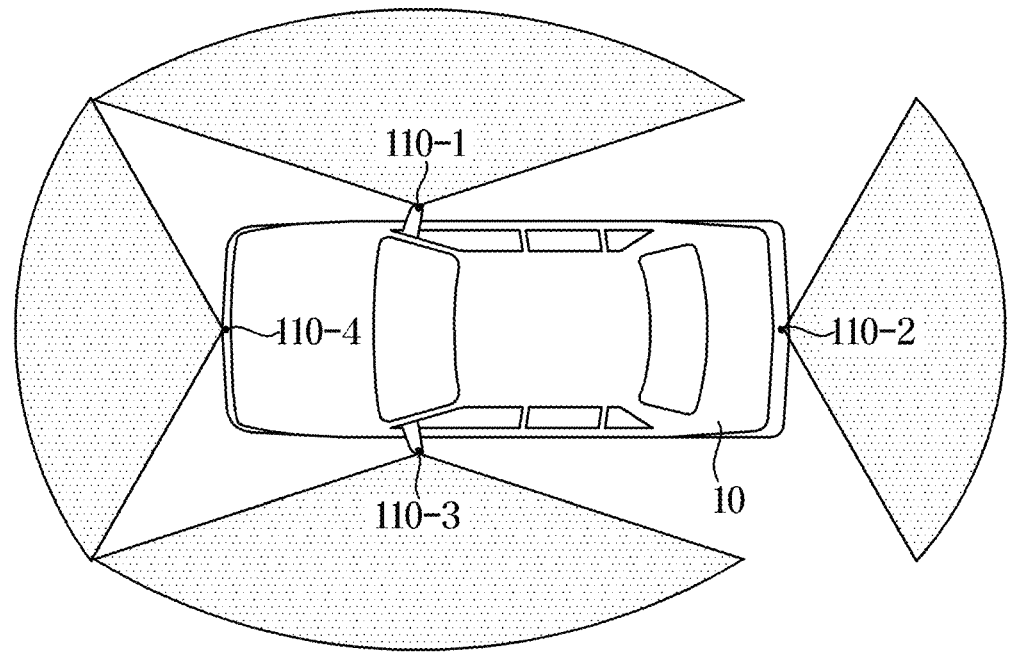

FIG. 3 is a diagram illustrating that the vehicle recognizes a parking area line according to an exemplary embodiment of the present disclosure.

Referring to FIG. 3, the sensors 110-1, 110-2, 110-3, and 110-4 may detect the external environment of the vehicle 10 in response to a control signal from the controller 120. The sensors 110-1, 110-2, 110-3, and 110-4 may detect a ground in all directions outside the vehicle 10, That is, the sensors 110-1, 110-2, 110-3, and 110-4 may detect the ground around the vehicle 10 to determine whether the vehicle 10 is located inside a parking area line.

In the instant case, for the sensors 110-1, 110-2, 110-3, and 110-4 to detect the ground outside the vehicle 10, an image processing technique may be utilized, or an artificial intelligence model for determining a parking area line by use of the parking area line as an input value may be utilized.

Accordingly, when it is determined that the vehicle 10 is located inside the parking area line as a result of the sensors 110-1, 110-2, 110-3, and 110-4 detecting the ground outside the vehicle 10, controller 120 may maintain the sensors in a sleep state without additional control.

That is, when the vehicle 10 is in the normal parking, because there is no need to use the sensors of the vehicle 10 to detect changes in the external environment, the controller 120 maintains the sensors in the sleep state, so that there is an effect of preventing waste of power.

On the other hand, when it is determined that the vehicle 10 is located outside the parking area line as a result of the sensors 110-1, 110-2, 110-3, and 110-4 detecting the ground outside the vehicle 10, controller 120 may detect changes in situations around the vehicle 10.

That is, when it is determined that the vehicle 10 is located outside the parking area, line, the controller 120 may be configured to determine as double parking and start detecting to move the vehicle 10.

When it is determined that at least one of the other vehicles 20 has attempted to leave, the controller 120 may control the power system and the steering device to move the vehicle 10.

Hereinafter, an exemplary embodiment in which the controller 120 determines that at least one of the other vehicles 20 has attempted to move for leaving will be described.

Figure 4:
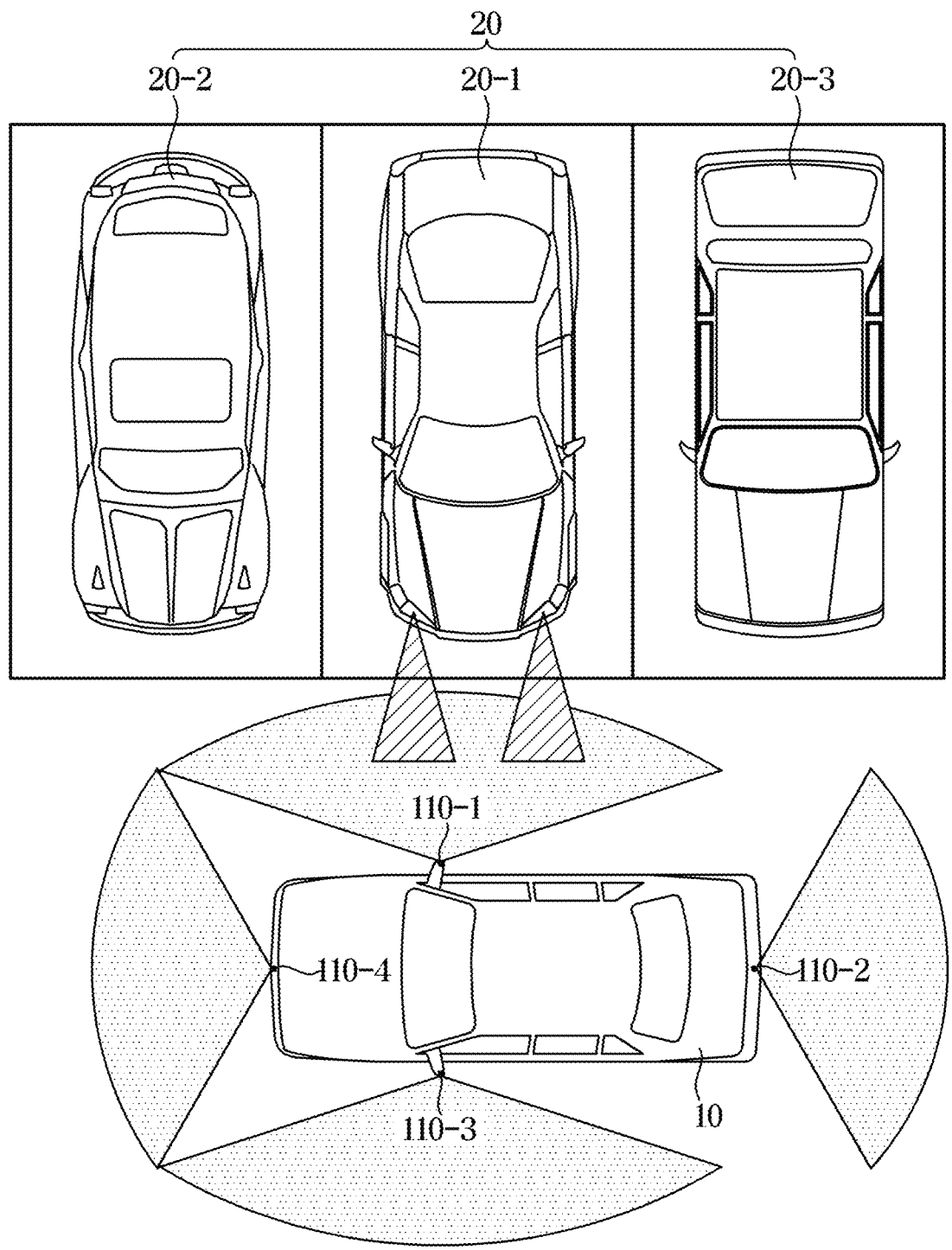
FIG. 4 is a diagram illustrating that other vehicle emits headlights toward the vehicle according to an exemplary embodiment of the present disclosure.

FIG. 4 is a diagram illustrating that other vehicle emits headlights toward the vehicle according to an exemplary embodiment of the present disclosure.

Referring to FIG. 4, the controller 120 may control the sensors 110-1, 110-2, 110-3, and 110-4 to detect the external environment of the vehicle 10, and determine that the other vehicle 20-1 has attempted to move for leaving when light is emitted from the headlights of the other vehicle 20-1.

The controller 120 may detect that the headlights or taillights of the other vehicle 20-1 are turned on by ignition of the other vehicle 20-1. That is, the controller 120 may detect that the lock of the other vehicle 20-1 is released and positioning lamps or the headlights or taillights are turned on.

The controller 120 may be configured to conclude that the other vehicle 20-1 intends to leave when the headlights, taillights or positioning lamps of the other vehicle 70-1 are turned on.

FIG. 4 illustrates that a front portion of the other vehicle 20-1 faces the vehicle 10, but the same control is possible even when a rear portion of the other vehicle 20-1 faces the vehicle 10.

The controller 120 may detect the amount of light emitted from the other vehicle 20-1 based on a detected value, and the detected amount of light may include a constant numerical value. The controller 120 may compare a numerical value indicating the amount of detected light with a predetermined reference value.

For example, in a case in which the reference value preset in the memory 122 is 1200 lm, the controller 120 may be configured to conclude that the headlights of the other vehicle 20-1 are turned on when the detected amount of light is 1300 lm.

Furthermore, the controller 120 may set a value lower than 1200 lm to the reference value considering that the amount of light of the positioning lamp is lower than that of the headlight.

Accordingly, the controller 120 may conclude that the other vehicle 20-1 has an intention to leave when it is determined that the headlights or positioning lamps of the other vehicle 20-1 are turned on.

Figure 5:
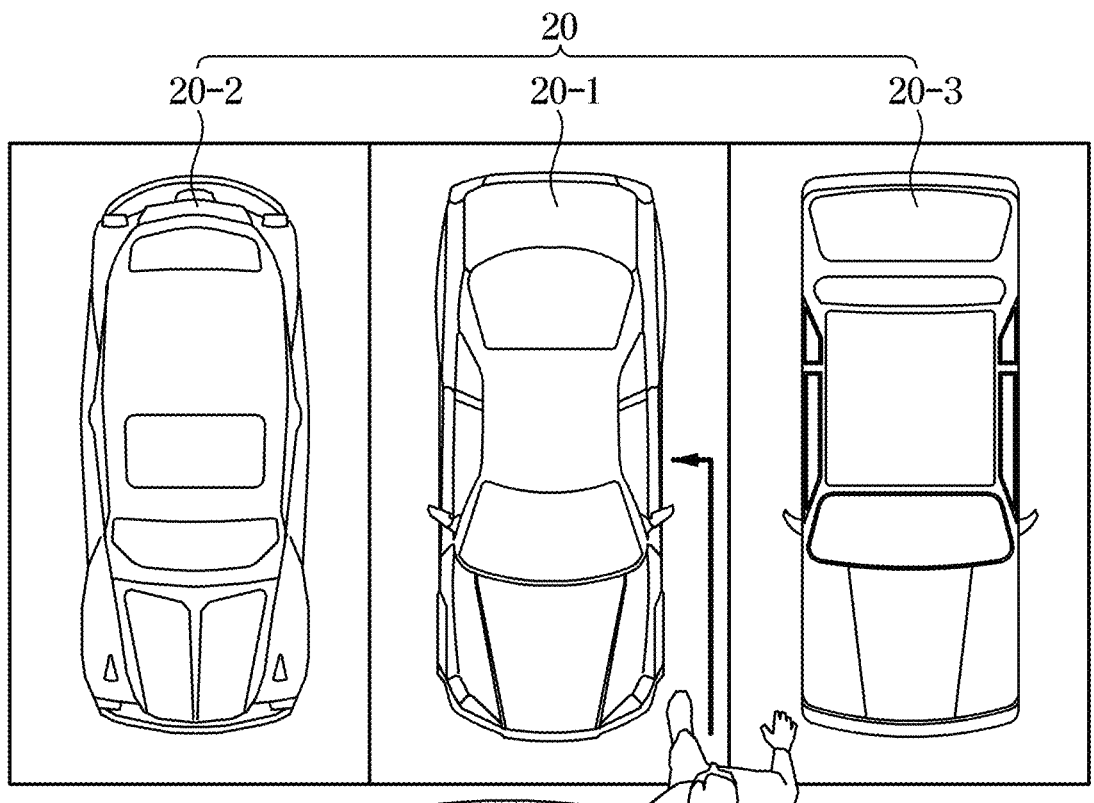
FIG. 5 is a diagram illustrating that the vehicle detects that a driver of the other vehicle enters the inside of the other vehicle according to an exemplary embodiment of t present disclosure.
Figure 5:
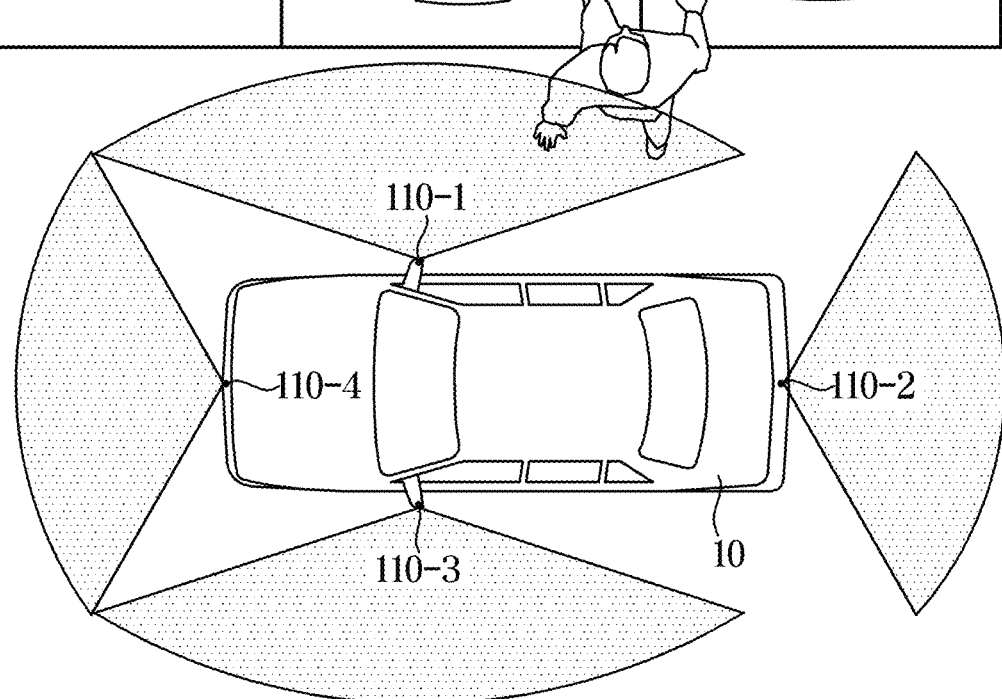

FIG. 5 is a diagram illustrating that the vehicle detects that a driver of the other vehicle enters the inside of the other vehicle according to an exemplary embodiment of the present disclosure.

Referring to FIG. 5, the controller 120 may detect that the driver of the other vehicle 20-1 approaches the vehicle 10, The controller 120 may detect the driver of the other vehicle 20-1 by use of a motion sensor or through image processing.

Thereafter, the controller 120 may detect that the driver of the other vehicle 20-1 moves away from the vehicle 10 and moves in the direction of the other vehicle 20-1, Because a case in which the driver of the other vehicle 20-1 moves in the direction of the other vehicle 20-1 may be to ride in the other vehicle 20-1 and leave, the controller 120 may be configured to determine that the other vehicle 20-1 has the intention to leave.

However, because the case in which the driver of the other vehicle 20-1 moves in the direction of the other vehicle 20-1 may have various intentions, such as a case of taking out luggage from the other vehicle 20-1, the above case may be determined in combination with the intention to leave described with reference to FIG. 4.

For example, the controller 120 may detect that the driver of the other vehicle 20-1 moves in the direction of the other vehicle 20-1, and may also detect that the positioning lamps of the other vehicle 20-1 are turned on or the headlights or taillights of the other vehicle 20-1 are turned on.

That is, when the driver of the other vehicle 20-1 moves in the direction of the other vehicle 20-1 and the positioning lamps, headlights or taillights of the other vehicle 20-1 are turned on after a predetermined time period elapses, the controller 120 may be configured to conclude that the other vehicle 20-1 has the intention to leave.

Accordingly, when the moving direction of the driver of the other vehicle 20-1 and whether or not the headlights or taillights of the other vehicle 20-1 are turned on are combined, the controller 120 may be configured to determine the intention of the other vehicle 20-1 to leave with high accuracy.

Figure 6:
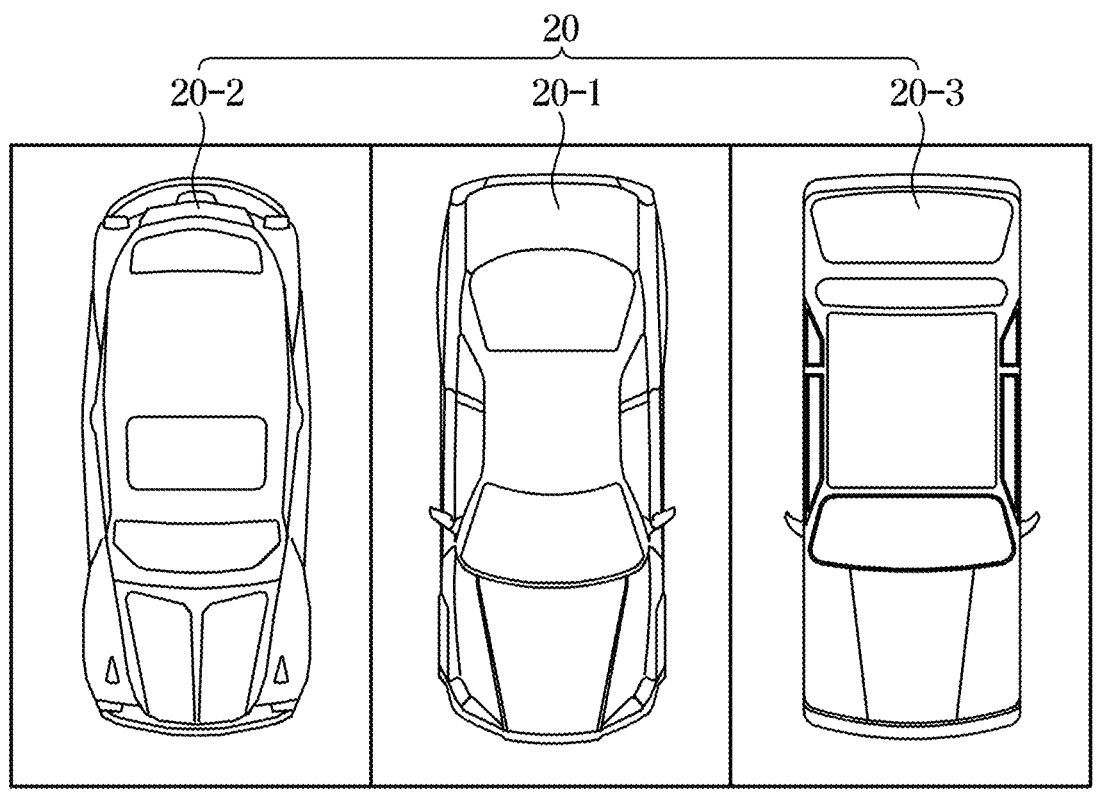
FIG. 6 is a diagram illustrating that the vehicle detects a motion for the driver of the other-vehicle to push the vehicle according to an exemplary embodiment of the present disclosure.
Figure 6:
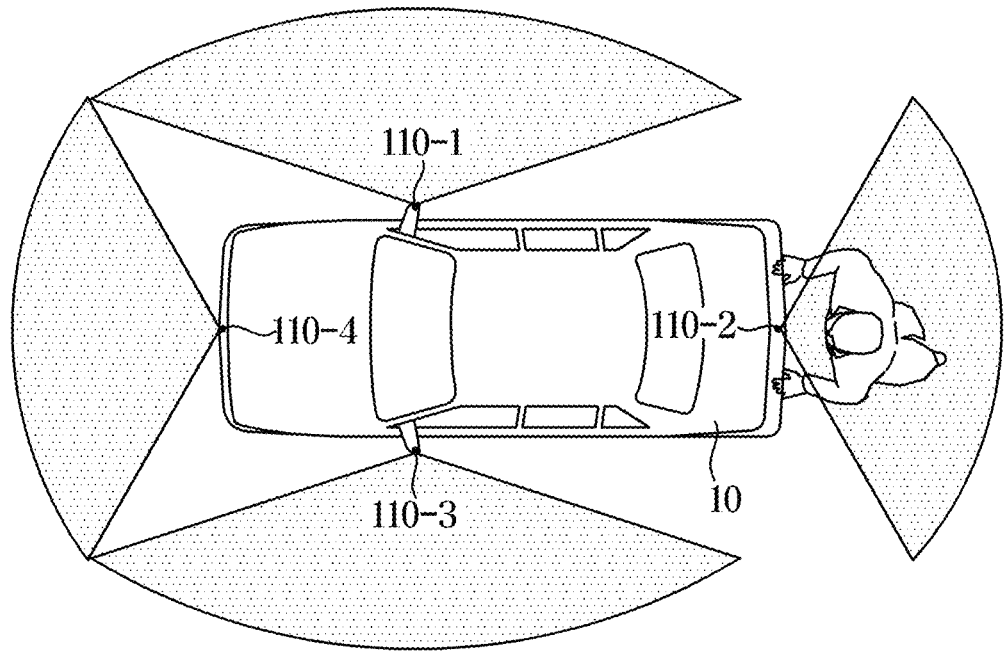

FIG. 6 is a diagram illustrating that the vehicle detects a motion for the driver of the other vehicle to push the vehicle according to an exemplary embodiment of the present disclosure. Referring to FIG. 6, the controller 120 may detect a motion of a driver of one of the other vehicles 20 for moving the vehicle 10.

A driver of one of the other vehicles 20 may directly push the vehicle 10 to move the vehicle 10 blocking a path of the other vehicles 20 and leave. A motion of a person for pushing the vehicle 10 may be previously stored in the memory 122.

Accordingly; the controller 120 may be configured to determine whether a motion for pushing the vehicle 10 is detected by detecting the outside of the vehicle 10 through the sensors 110-1, 110-2, 110-3, and 110-4.

In the instant case, the motion for pushing the vehicle 10 may include a case in which both arms of a person extend in the direction of the vehicle 10 and the present posture is maintained for a predetermined time period or longer.

As described with reference to FIG. 5, the controller 120 may detect a motion for pushing the vehicle 10 by use of a motion sensor or through image processing.

Furthermore, the sensor unit may include a gyro sensor, and the gyro sensor may detect a rotation angle of the vehicle 10 using the angular momentum principle. Accordingly, the controller 120 may detect the movement of the vehicle 10 by controlling the gyro sensor.

That is, when a driver of one of the other vehicles 20 pushes the vehicle 10 and shaking of the vehicle 10 occurs, the controller 120 may detect this by use of the gyro sensor, and may also determine that the one of the other vehicles 20 has an intention to leave.

Although FIG. 6 illustrates that a driver of at least one of the other vehicles 20 pushes the rear portion of the vehicle 10, the same control is possible even when the driver pushes the front portion of the at least one of the other vehicles 20.

FIG. 4, FIG. 5 and FIG. 6 illustrate an exemplary embodiment in which the controller 120 is configured to determine whether at least one of the other vehicles 20 has an intention to leave, but the present disclosure is not limited thereto and may include various embodiments.

The sensors 110-1, 110-2, 110-3, and 110-4 may include a microphone configured for measuring noise, and the controller 120 may detect ambient noise by controlling the microphone. Accordingly, when it is determined that noise due to ignition of at least one of the other vehicles 20 is generated within a predetermined distance, the controller 120 may be configured to determine that the at least one of the other vehicles 20 has the intention to leave.

Figure 7:
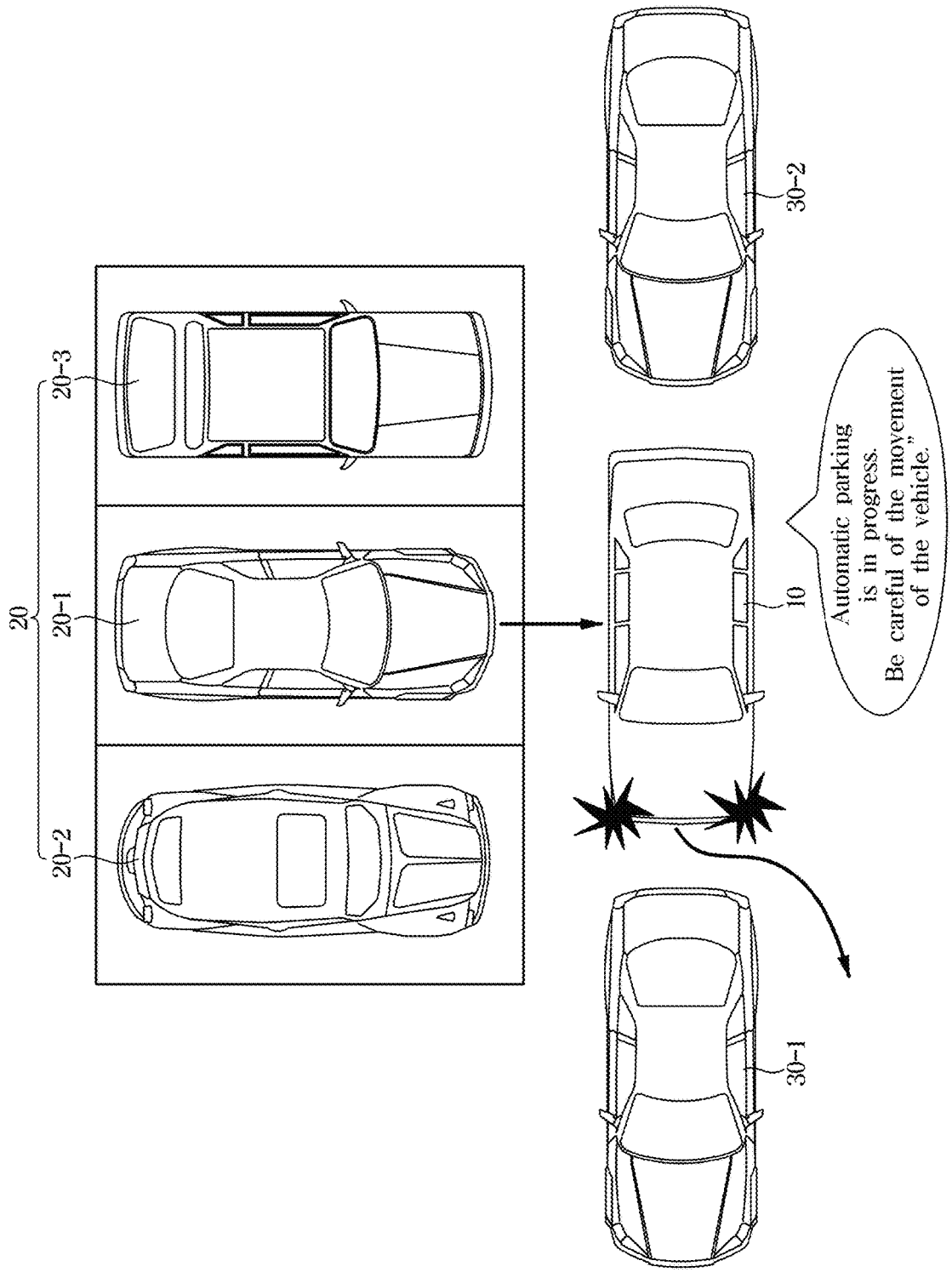
FIG. 7 is a diagram illustrating that the vehicle moves along a set movement path according to an exemplary embodiment of the present disclosure.

FIG. 7 is a diagram illustrating that the vehicle moves along a set movement path according to an exemplary embodiment of the present disclosure.

Referring to FIG. 7, the controller 120 according to various exemplary embodiments of the present disclosure may be configured to determine a movement distance and a movement angle based on at least one of image data, radar data, and ultrasound data of an external environment, and an attempt of at least one of the other vehicles 20 to move, and update the movement distance and the movement angle to avoid an obstacle when the obstacle is located on a movement trajectory according to the determined movement distance and the determined movement angle.

As illustrated in FIG. 7, when the movement distance and the movement angle are determined as a forward movement of the vehicle 10 based on the attempt of the other vehicle 20-1 to move, a parked vehicle 30-1 may be located on the movement trajectory according to the determined movement distance and the determined movement angle.

Accordingly, when a parked vehicle is located on a movement trajectory to be moved, the movement distance and the movement angle may be updated to avoid the parked vehicle 30-1 located on the movement trajectory.

However, unlike illustrated in FIG. 7, when the vehicle 10 determines the movement distance and the movement angle of a movement trajectory to reverse, the vehicle 10 may update the movement distance and the movement angle to avoid a parked vehicle 30-2 located behind the vehicle 10.

In the instant case, when the controller 120 determines that the movement of the vehicle 10 is possible by determining the movement distance and the movement angle, the controller 120 may control the output device 142 to output a message about the movement of the vehicle 10. The output device 142 may include a speaker, and the controller 120 may output a message preset in the speaker.

For example, the preset message may include a message, such as "Automatic parking is in progress. Be careful of the movement of the vehicle 10.". The controller 120 may output the preset message to notify pedestrians around the vehicle 10 of the movement of the vehicle 10, preventing accidents caused by the movement of the vehicle 10.

Furthermore, the output device 142 may include external lamps of the vehicle 10, and the controller 120 may also control the output device 142 to blink the external lamps of the vehicle 10 to visually notify pedestrians around the vehicle 10 that the vehicle 10 is moving.

Accordingly, the vehicle 10 according to an exemplary embodiment has an effect of preventing accidents which may occur when the vehicle 10 moves automatically.

Figure 8:
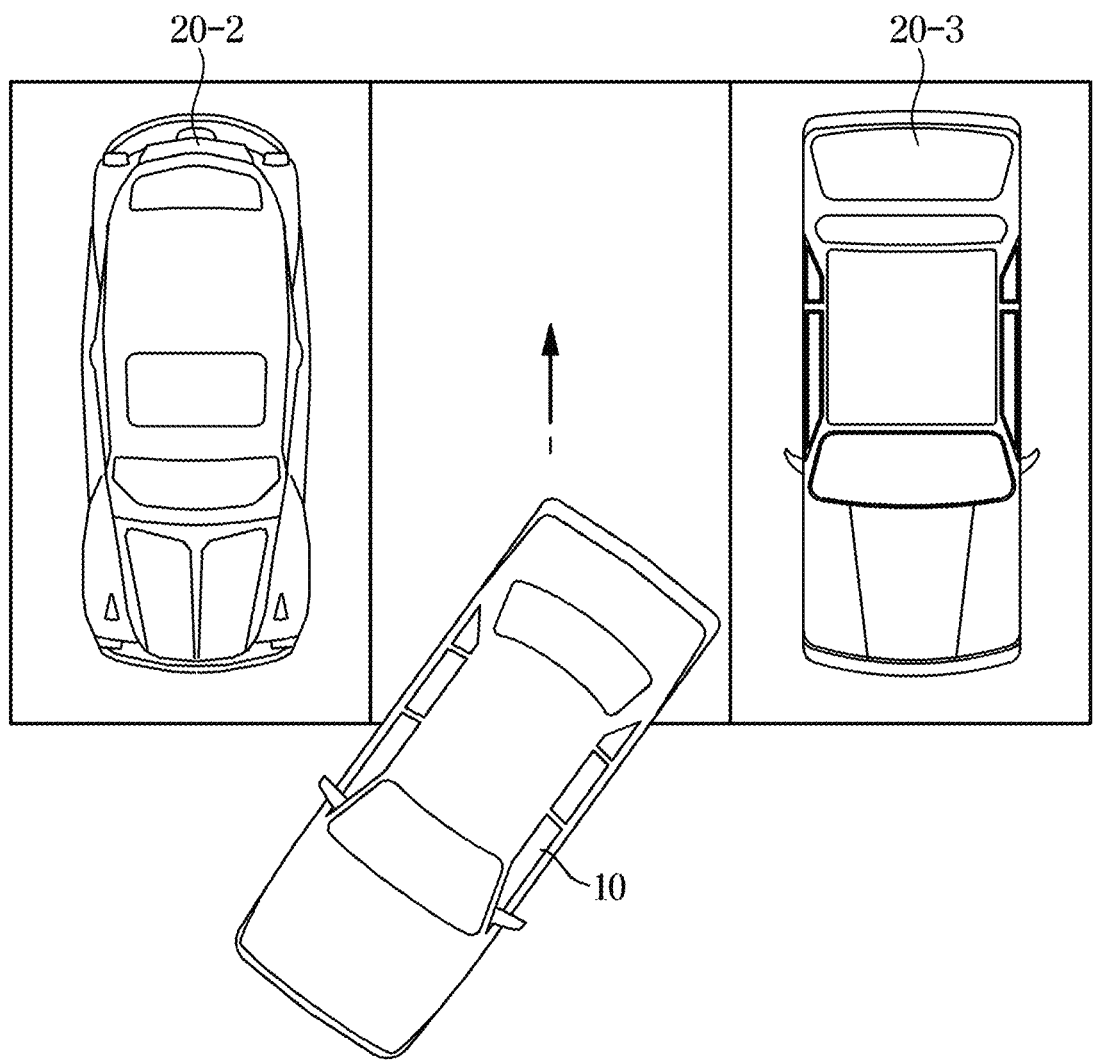
FIG. 8 is a diagram illustrating a case in which the vehicle parks in a parking space from which the other vehicle has left according to an exemplary embodiment of the present disclosure.

FIG. 8 is a diagram illustrating a case in which the vehicle parks in a parking space from which the other vehicle has left according to an exemplary embodiment of the present disclosure.

Referring to FIG. 8, the controller 120 may detect an attempt of the other vehicle 20-1 to move, and when the other vehicle 20-1 leaves a parking space where it has located after moving, control the steering device and the power system to move to the corresponding parking space.

Thereafter, the controller 120 may control the communication device 130 to transmit a message notifying that the vehicle 10 is normally parked within the parking area line to the user terminal 50.

Because the vehicle 10 according to various exemplary embodiments of the present disclosure may perform the normal parking after the vehicle 10 moves, movement of the vehicle 10 due to double parking may be prevented with one movement.

Accordingly, the driver of the vehicle 10 according to an exemplary embodiment has an effect of minimizing time and effort for moving the vehicle 10 so that the other vehicles 20 may leave.

Hereinafter, a control method of the vehicle 10 according to an exemplary embodiment will be described. The vehicle 10 according to the above-described embodiment may be applied to the control method of the vehicle 10, which will be described below Therefore, the contents described above with reference to FIG. 1, FIG. 2, FIG. 3. FIG. 4, FIG. 5, FIG. 6, FIG. 7, and FIG. 8 are equally applicable to the control method of the vehicle 10 according to an exemplary embodiment without a special description.

Figure 9:
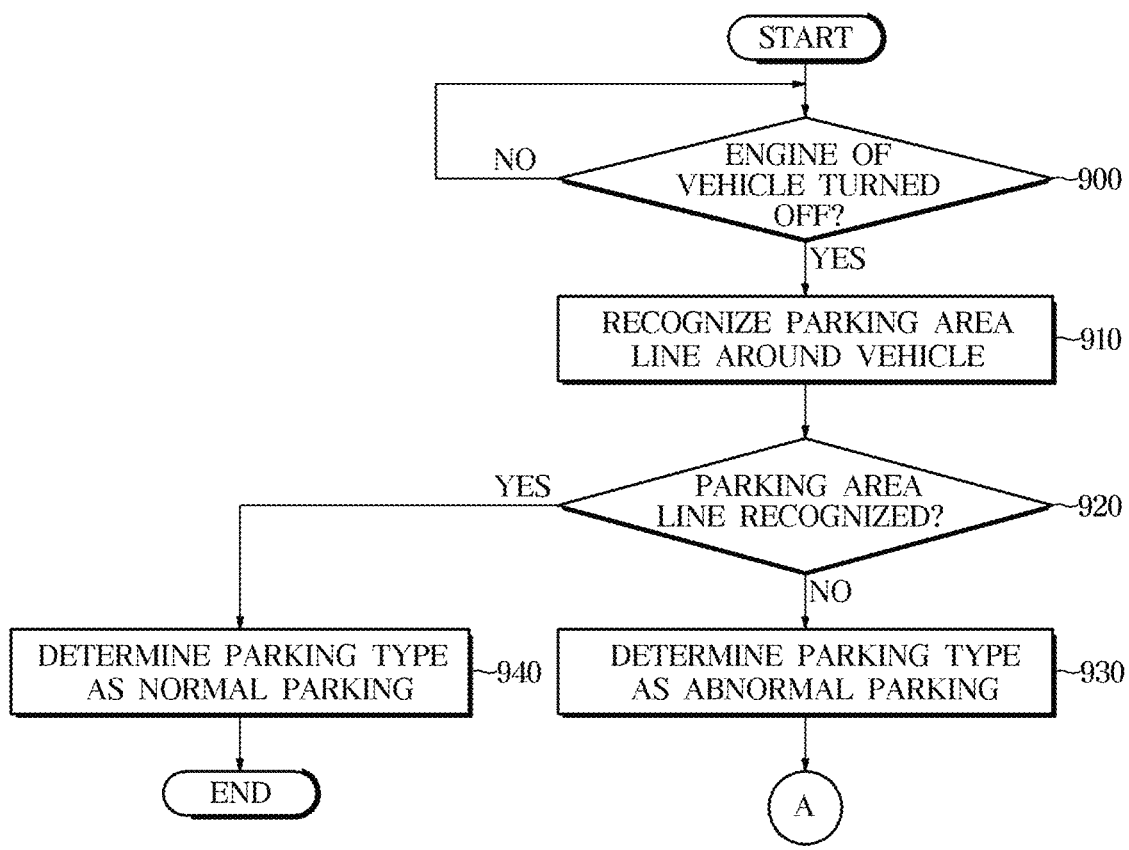
FIG. 9 is a flowchart of a case in which the vehicle is configured to determine a parking type according to an exemplary embodiment of the present disclosure.
Figure 10:
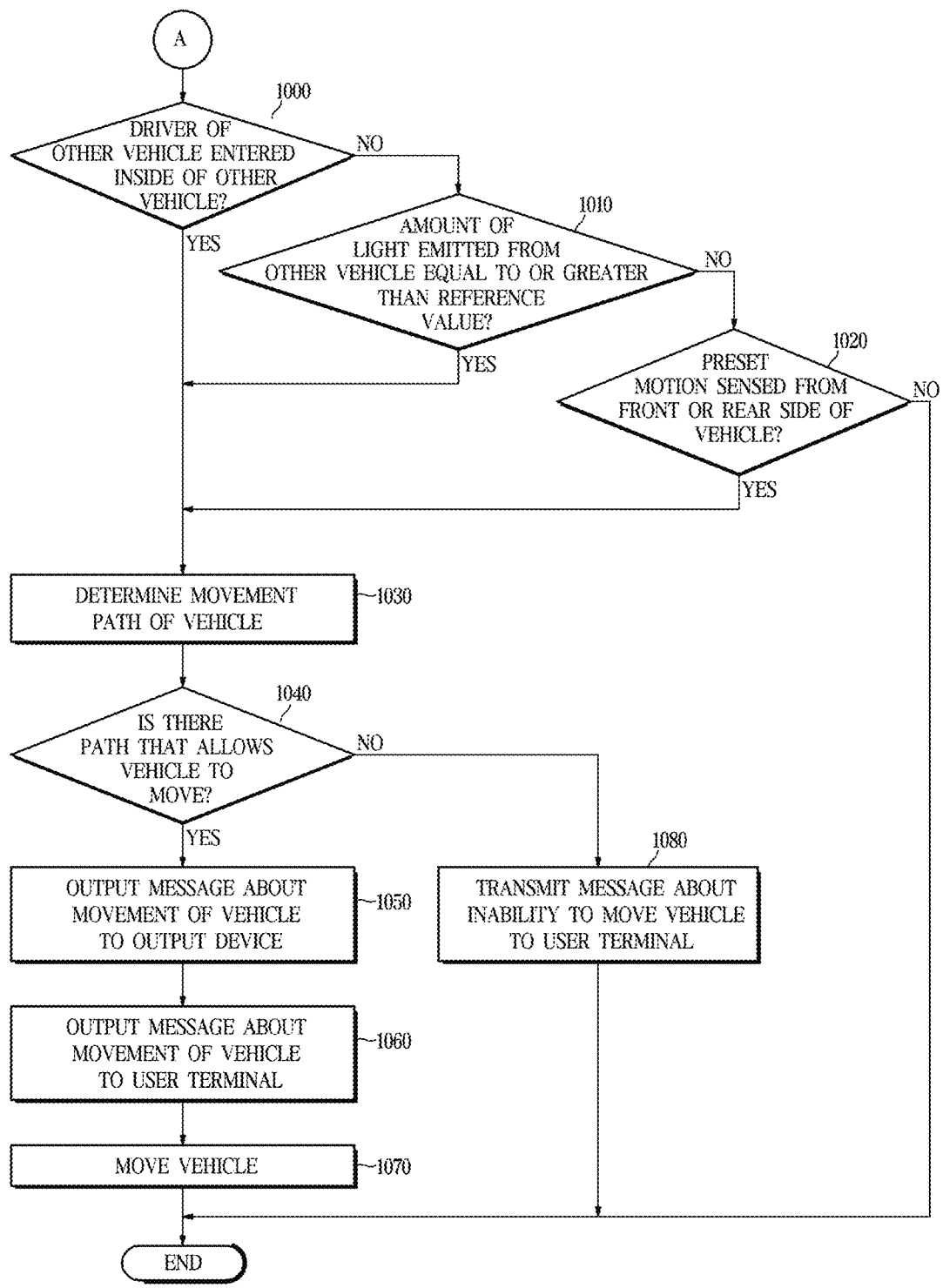
FIG. 10 is a flowchart of a case in which the vehicle is configured to determine a movement path in the case of abnormal parking according to an exemplary embodiment of the present disclosure.

FIG. 9 is a flowchart of a case in which the vehicle determines a parking type according to an exemplary embodiment of the present disclosure, and FIG. 10 is a flowchart of a case in which the vehicle determines a movement path in the case of abnormal parking according to an exemplary embodiment of the present disclosure.

Referring to FIG. 9, the controller 120 may be configured to determine whether an engine of the vehicle 10 is turned off for parking (900). Thereafter, when it is determined that the engine of the vehicle 10 is turned off (YES in 900), the controller 120 may recognize a parking area line around the vehicle 10 (910).

In the instant case, the parking area line around the vehicle 10 may be generally drawn with painting equipment using paint, but may be marked using a rope, and may correspond to a parking area line without limitation as long as the area may be divided.

The controller 120 may recognize the parking area line through image processing, or a machine learning model that utilizes the parking area line as an input value may be utilized.

When the parking area line is recognized (YES in 920), the controller 120 may be configured to determine the parking type of the vehicle 10 as the normal parking. The controller 120 may be configured to determine the parking type as the normal parking when parking area lines are recognized in at least two or more areas of front, rear, left and right areas of the vehicle 10. That is, because when the controller 120 recognizes the parking area line, this corresponds to a case in which the vehicle 10 is normally parked inside the parking area line, movement of the vehicle 10 is not required.

In the instant case, because the controller 120 does not detect a change in the surrounding environment, power consumption may be prevented.

When the parking area line is not recognized (NO in 920), the controller 120 may be configured to determine the parking type as the abnormal parking (930). When the parking area line is recognized in one area or less of the front, rear, left and right areas of the vehicle 10, the controller 120 may be configured to determine the parking type as the normal parking (940).

Next, referring to FIG. 10, when the parking type of the vehicle 10 is determined to be the abnormal parking, the controller 120 may be configured to determine whether a driver of at least one of the other vehicles 20 has entered the inside of the at least one of the other vehicles 20 (1000). That is, to determine the intention of at least one of the other vehicles 20 to leave, the controller 120 may detect that a driver of the at least one of the other vehicles 20 moves away from the vehicle 10 and moves in the direction of the at least one of the other vehicles 20, and then determine whether the driver of the at least one of the other vehicles 20 enters the inside of the at least one of the other vehicles 20.

When the controller 120 does not detect that the driver of the at least one of the other vehicles 20 enters the inside of the at least one of the other vehicles 20 (NO in 1000), it may determine whether the amount of light emitted from the at least one of the other vehicles 20 is equal to or greater than the reference value (1010).

That is, the controller 120 may detect that headlights or taillights of at least one of the other vehicles 20 are turned on by ignition or unlocking of the at least one of the other vehicles 20.

Furthermore, when it is determined that the amount of light emitted from at least one of the other vehicles 20 is not greater than the reference value (NO in 1010), the controller 120 may be configured to determine whether the preset motion is detected from the front side or the rear side of the vehicle 10 (1020).

The preset motion may include a motion for a person to push the vehicle 10, and the controller 120 may be configured to determine whether a motion for pushing the vehicle 10 is detected from the front side or the rear side of the vehicle 10. That is, the controller 120 may be configured to determine whether a driver or passenger of at least one of the other vehicles 20 has the intention to move the vehicle 10 to allow the at least one of the other vehicles 20 to leave.

Accordingly, when the driver of the at least one of the other vehicles 20 enters the inside of the at least one of the other vehicles 20 (YES in 1000), the amount of light emitted from the at least one of the other vehicles 20 is equal to or greater than the reference value (YES in 1010), or the preset motion is detected from the front side or the rear side of the vehicle 10 (YES in 1020), the controller 120 may be configured to determine that the at least one of the other vehicles 20 has the attempt to move.

Thereafter, the controller 120 may be configured to determine a movement path of the vehicle 10 to allow the at least one of the other vehicles 20 to leave (1030). The controller 120 may be configured to determine whether there is an area where the vehicle 10 may move to allow the at least one of the other vehicles 20 to leave, and determine a movable path depending on the determination result.

When the at least one of the other vehicles 20 may not leave even if the vehicle 10 moves or movement itself is impossible due to an obstacle, the controller 120 may not move the vehicle 10 and may transmit a message about the inability to move the vehicle 10 to the user terminal 50 (1080).

Accordingly, the driver of the vehicle 10 may take action to move the vehicle 10, and the action to move the vehicle 10 may include, for example, an action to move the obstacle to another space.

When it is determined that there is a path that allows the vehicle 10 to move (YES in 1040), the controller 120 may output a message about the movement of the vehicle 10 to the output device 142 (1050).

Also, the controller 120 may output the message about the movement of the vehicle 10 to the output device 142, and at the same time transmit the message about the movement of the vehicle 10 to the user terminal 50 (1060).

Accordingly, the driver of the vehicle 10 may identify information related to whether or not the vehicle 10 moves and a location where the vehicle 10 has moved.

Thereafter; the controller 120 may control the power system and the steering device to move the vehicle 10 along the determined movement path (1070). The determined movement path may include a path to an area where the at least one of the other vehicles 20 has been parked after the at least one of the other vehicles 20 leaves.

Therefore, the vehicle 10 and the control method thereof according to an exemplary embodiment have an effect of reducing effort of a driver to position a shift lever in a neutral (N) stage while double parking and reducing property damage and personal injury which may occur when a driver of at least one of the other vehicles 20 pushes the vehicle 10.

As is apparent from the above, according to a vehicle and a control method thereof according to an aspect, the vehicle can automatically move in response to an attempt of other vehicle already parked to leave when parked around the other already parked vehicle, so that a driver of the other already parked vehicle does not need to use a physical force and the risk of an accident may be reduced.

The disclosed exemplary embodiments of the present disclosure may be implemented in a form of a recording medium storing instructions executable by a computer. The instructions may be stored in a form of program code, and when executed by a processor, a program module may be generated to perform the operations of the disclosed exemplary embodiments of the present disclosure. The recording medium may be implemented as a non-transitory computer-readable recording medium.

The non-transitory computer-readable recording medium includes any type of recording medium in which instructions readable by the computer are stored.

For example, the recording medium may include a read only memory (ROM), a random access memory (RAM), a magnetic tape, a magnetic disk, a flash memory, an optical data storage device, and the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle comprising:
   a sensor unit provided to detect an external environment of the vehicle;
   a steering device provided to steer wheels of the vehicle;
   a power system provided to transmit power to the wheels; and
   a controller configured for determining an attempt of other vehicle to move when a parking of the vehicle is abnormal parking and for controlling the power system and the steering device of the vehicle to move the vehicle when the controller concludes that there is the attempt of the other vehicle to move,
   wherein the controller is further configured to detect a driver of the other vehicle, the driver moving in a direction of the other vehicle, based on a sensing value of the sensor unit, and to conclude that there is the attempt of the other vehicle to move when the driver enters the inside of the other vehicle.

2. The vehicle of claim 1, wherein the controller is further configured to detect an amount of light emitted from the other vehicle based on the sensing value of the sensor unit and is configured to conclude that there is the attempt of the other vehicle to move when the amount of light is equal to or greater than a reference value.

3. The vehicle of claim 1, wherein the controller is further configured for concluding that there is the attempt of the other vehicle to move when a preset motion of the vehicle is detected from a front side or a rear side of the vehicle based on the sensing value of the sensor unit.

4. The vehicle of claim 1, wherein the controller is configured for determining a movement distance and a movement angle of the vehicle for allowing the parking of the vehicle to be normal parking upon concluding that there is the attempt of the other vehicle to move, and is configured to control the power system and the steering device of the vehicle based on the determined movement distance and the determined movement angle.

5. The vehicle of claim 4, wherein the controller is configured to update the determined movement distance and the determined movement angle to avoid an obstacle when the obstacle is located on a movement path of the vehicle according to the determined movement distance and the determined movement angle.

6. The vehicle of claim 4, wherein the controller is configured to move to a minimum movement distance and a minimum movement angle of the vehicle for allowing the other vehicle to leave when the movement distance and the movement angle for allowing the parking of the vehicle to be the normal parking are not secured, and is configured to control the power system and the steering device of the vehicle to move the vehicle to a parking space when the other vehicle leaves the parking space where the other vehicle has been located.

7. The vehicle of claim 1, further including a communication device communicatively connected to the controller, wherein the controller is configured to control the communication device to transmit information related to the movement of the vehicle to a user terminal based on the movement of the vehicle.

8. The vehicle of claim 1, further including an output device communicatively connected to the controller, wherein the controller is configured to control the output device to output a message about the movement of the vehicle to the output device based on the movement of the vehicle.

9. The vehicle of claim 1, wherein the sensor unit includes at least one of a camera provided to obtain image data of the external environment of the vehicle, a radar provided to obtain radar data of the external environment of the vehicle, and an ultrasound sensor provided to obtain ultrasound data of the external environment of the vehicle.

10. A control method of a vehicle which includes a sensor unit provided to detect an external environment of the vehicle, a steering device provided to steer wheels of the vehicle, and a power system provided to transmit power to the wheels, the control method comprising:
    determining, by a controller, an attempt of other vehicle to move when a parking of the vehicle is abnormal parking; and
    controlling the power system and the steering device of the vehicle to move the vehicle when the controller concludes that there is the attempt of the other vehicle to move,
    wherein the determining of the attempt of the other vehicle to move includes:
        detecting a driver of the other vehicle, the driver moving in a direction of the other vehicle, based on a sensing value of the sensor unit; and
        concluding that there is the attempt of the other vehicle to move when the driver enters the inside of the other vehicle.

11. The control method of claim 10, wherein the determining of the attempt of the other vehicle to move further includes:
    detecting an amount of light emitted from the other vehicle based on the sensing value of the sensor unit; and
    concluding that there is the attempt of the other vehicle to move when the amount of light is equal to or greater than a reference value.

12. The control method of claim 10, wherein the determining of the attempt of the other vehicle to move further includes concluding that there is the attempt of the other vehicle to move when a preset motion of the vehicle is detected from a front side or a rear side of the vehicle based on the sensing value of the sensor unit.

13. The control method of claim 10, wherein the controlling of the power system and the steering device includes:
    determining a movement distance and a movement angle of the vehicle for allowing the parking of the vehicle to be normal parking based on the attempt of the other vehicle to move; and
    controlling the power system and the steering device of the vehicle based on the determined movement distance and the determined movement angle.

14. The control method of claim 13, further including updating, by the controller, the determined movement distance and the determined movement angle to avoid an obstacle when the obstacle is located on a movement path of the vehicle according to the determined movement distance and the determined movement angle.

15. The control method of claim 13, wherein the controlling of the power system and the steering device includes:
    moving to a minimum movement distance and a minimum movement angle of the vehicle for allowing the other vehicle to leave when the movement distance and the movement angle for allowing the parking of the vehicle to be the normal parking are not secured; and controlling the power system and the steering device of the vehicle to move the vehicle to a parking space when the other vehicle leaves the parking space where the other vehicle has been located.

16. The control method of claim 10, further including controlling, by the controller, a communication device communicatively connected to the controller, to transmit information related to the movement of the vehicle to a user terminal based on the movement of the vehicle.

17. The control method of claim 10, further including controlling, by the controller, an output device communicatively connected to the controller to output a message about the movement of the vehicle to the output device based on the movement of the vehicle.

18. The control method of claim 10, wherein the sensor unit includes at least one of a camera provided to obtain image data of the external environment of the vehicle, a radar provided to obtain radar data of the external environment of the vehicle, and an ultrasound sensor provided to obtain ultrasound data of the external environment of the vehicle.

\* \* \* \* \*